United States Patent [19]

Tabalba

[11] 3,823,272

[45] July 9, 1974

[54] ELECTRONIC TELEPHONE TRANSMISSION CIRCUIT

[75] Inventor: Camilo Manansala Tabalba, Harlow, England

[73] Assignee: International Standard Electric Corporation, New York, N.Y.

[22] Filed: Nov. 21, 1972

[21] Appl. No.: 308,799

[30] Foreign Application Priority Data

Dec. 9, 1971 Great Britain .................... 57196/71

[52] U.S. Cl. ............................ 179/81 A, 179/170 T

[51] Int. Cl. .......................... H04m 1/58, H04b 3/50

[58] Field of Search ....................... 179/81 A, 170 T

[56] References Cited

UNITED STATES PATENTS 3,440,367 4/1969 Holtz ............................... 179/81 A 3,453,394 7/1969 Linse ............................... 179/81 A 3,462,560 8/1969 Holzman ............................ 179/170

*Primary Examiner*—Kathleen H. Claffy

*Assistant Examiner*—Mitchell Saffian

*Attorney, Agent, or Firm*—J. B. Randen; D. P. Warner

[57] ABSTRACT

This electronic telephone transmission circuit (subset) replaces the conventional subset using the combination of carbon microphone, hybrid transformer and high sensitivity receiver. The circuit includes transmitter and receiver transistor amplifiers, means for effecting line loss compensation for both directions of transmission, and a resistor-capacitor active network configuration for giving all the properties of a hybrid transformer network without the use of any inductances.

2 Claims, 2 Drawing Figures

ELECTRONIC TELEPHONE TRANSMISSION CIRCUIT

This invention relates to telephone subscriber equipment, generally known as telephone subsets, and has particular reference to electronic realizations of the telephone transmission circuit of such equipment.

According to the invention, there is provided an electronic telephone transmission circuit (subset) which comprises an electrodynamic microphone, a transistor amplifier for said microphone, a telephone receiver, a transistor amplifier for said receiver, means for effecting variable line loss compensation independently for each direction of transmission from said subset over a two-wire line connected thereto, and a resistor-capacitor active network configuration adapted to effect directional separation to any desired extent within said subset without the use of a hybrid transformer.

Basically, the subset has to perform a number of diverse functions simultaneously, harmonizing these functions to the best advantage and with the least interference one with the other. These functions include coupling a microphone and a receiver to a bothways (two-wire) line by way of a hybrid circuit (four-wire/2-wire coupling unit), compensating for varying cable losses as between one line and another (line equalization), supplying direct current to the microphone, if necessary, (e.g. in the case of a carbon microphone), and to any included amplifiers and visual signalling devices.

The present invention is directed toward an electronic version of a subset wherein inductances are eliminated, and the various functions are realized by means of semiconductor devices, resistors and capacitors alone, and thus includes the capability of being developed in integrated circuit form.

In an embodiment of the invention to be described, the microphone output is amplified and controlled by variable impedance so as to give compensation for variable line loss. The receiver is driven by an amplifier which also is compensated for variable line loss. The four-wire to two-wire transmission hybrid balance is obtained by active device configuration. The circuit is thus adapted to replace conventional subsets employing a carbon microphone, a hybrid transformer and a high sensitivity receiver.

The invention will now be more particularly described with reference to the accompanying drawing illustrating in FIG. 1 the circuit configuration of a complete subset, and in FIG. 2 the equivalent circuit in block form of the hybrid function derived in the circuit of FIG. 1.

Figure 1:
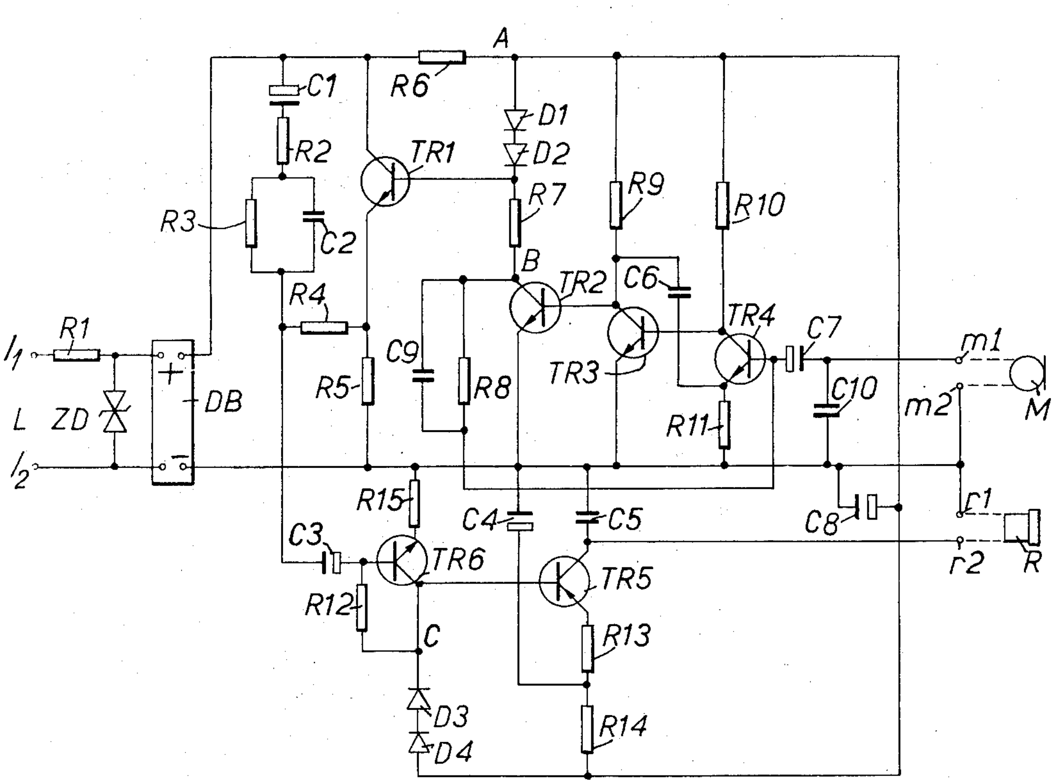
Figure 2:
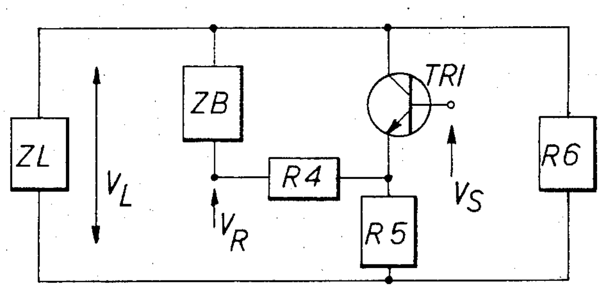

Referring now to FIG. 1, the microphone M, of electro-dynamic construction, is connected to terminals $m_1$ and $m_2$, the receiver R to terminals $r_1$ and $r_2$, and the subscriber's line L to terminals $l_1$ and $l_2$. Direct current is received over the line from the exchange in the normal manner when the line is connected up at the exchange, and passed via a resistor R1 and diode bridge DB — which has the effect of rectifying the line potential, however it appears, to the plus and minus values shown on the unit. The equipment comprises a three-stage microphone amplifier TR4, TR3, TR2 (in that order) together with a separate line-feed stage TR1, and a two-stage receiver amplifier TR5, TR6, together with various resistor and capacitor networks having a balancing or equalizing function.

The microphone output alternating voltage is amplified by transistors TR1, TR2, TR3 and TR4 and the amplified signal appears across $l_1$ and $l_2$. Transistors TR2, TR3, and TR4 comprise a three-stage amplifier in which the bias currents are stabilised by direct current feedback from the collector of TR2 to the base of TR4 through resistor R8. The amplifier gain of this stage is stabilised by alternating current feedback also through R8. The capacitors C6 and C9 provide high-frequency filtering to prevent unwanted self-oscillation. The alternating current output of transistor TR2 passes through resistor R7 and diodes D1 and D2 and is returned to the base line through capacitor C8.

The alternating voltage drop across the impedance of diodes D1 and D2 is converted by transistor TR1 into an amplified alternating current which divides into three parts: first part through R6; second part through C1 and R2, splitting again through R3 and C2 and then combining through R4; and the third part through DB and R1 and then the subscriber's line. Such division of currents constitutes the hybrid action which is elaborated below. The composite network C1 – R2 – R3 – C2 constitutes the balancing impedance in this action. The alternating voltage across D1 and D2 is dependent upon the impedance of these diodes, and the direct current bias through D1 and D2 to the line current is such as to change the impedance corresponding to a change in subscriber line length. That is, the alternating voltage is highest for the longest subscriber line, and lowest for the shortest subscriber line. This operation constitutes transmit regulation which is further described below.

The receiver amplifier circuit consists of transistors TR6 and TR5. The received alternating current from the subscriber line passes through C1 AND R2 splitting between R3 and C2 and recombining through C3 into the base of TR6. This current is amplified and regulated by the ratio of the impedance of the diodes D3 and D4 to that of R12. The diodes' impedance depends as before on the subscriber's line. Thus, maximum gain occurs at the longest subscriber's line and minimum gain at the shortest. This operation constitutes receive regulation which also is further elaborated below.

The output voltage of transistor TR6 at the collector is amplified by TR5. Resistor R14 provides the direct current bias for TR5, while resistor R13 provides alternating current feedback for stabilising the alternating voltage gain from the base to the collector of TR5. The output alternating voltage of TR5 appears across terminals $r_1$ and $r_2$ and is thus reproduced by the receiver R as the audible signal. In the receiver amplifier circuit, capacitor C3 is a direct-current blocking capacitor, and capacitor C4 is a decoupling capacitor which provides the alternating current return path for the collector current output of transistor TR5.

A protection circuit which is provided consists of diode bridge DB to protect the amplifiers against direct current or voltage polarity reversals from the line, and bilateral breakdown diode ZD protects against high voltage surges appearing across terminals $l_1$ and $l_2$. Resistor R1 limits the surge currents when ZD breaks down.

Hybrid Transformer Action

The usual three-winding transformer of the conventional subset, which provides the hybrid action necessary for effectively preventing interference between the transmit and receive paths, is here eliminated, being replaced by a circuit balancing arrangement now to be described with reference to FIG. 2. In this figure, let the R-C network consisting of C1, R2, C2, and R3 be represented by $Z_B$, and the subscriber line impedance inclusive of the telephone exchange termination be $Z_L$, then the hybird circuit will be as illustrated in the figure.

Defining the various parameters as follows:

$Y_L = 1/Z_L$, line admittance;
$Y_B = 1/Z_B$, balance network admittance;
$G_4 = 1/R_4$, ratio arm conductance;
$G_5 = 1/R_5$, ratio arm conductance;
$G_6 = 1/R_6$, source conductance of TR1;
$V_S$ = signal from previous amplification stage;
$V_R$ = signal input to the receiver amplifier;
$V_L$ = signal to the line;
$A_v = V_L/V_S$ = transmit voltage gain through the hybrid network;
$\alpha$ = common-base current gain of TR1;

it can be shown that the voltage gain is $$A_v = [\alpha G_5 - (1-\alpha)G_4]/(G_6 + Y_L) \quad \text{Equ. (1)}$$

Assume $\alpha G_5$ much greater than $(1-\alpha)G_4$, then $$A_v \approx \alpha G_5/(G_6 + Y_L) \quad \text{Equ. (2)}$$

Equation 2 shows the independence under these conditions of $A_v$ from $G_4$ and $Y_B$. Hence, one may be able to choose any value of $G_4$ and $Y_B$.

To obtain the conditions for hybrid balance, $V_R$ should be substantially zero when $V_S$ is present from the microphone. It can be shown that a condition exists for $V_R = 0$, that is, $$Y_S/G_4 = (G_6 + Y_L)/G_5 \quad \text{Equ. (3)}$$

When $V_S = 0$, and $V_L$ exists owing to an incoming signal from the line, a finite value of $V_R$ will then exist. The hybrid balance is defined by the ratio of this new value of $V_R$ to the value of $V_R$ when $V_S$ existed, provided that $V_L$ is the same in both cases. The hybrid balance is essential when transmitting and receiving signals on a single pair of lines such as represented by $Z_L$. Without this balance, an oscillatory condition will exist in which $V_R$ will maintain the level of $V_S$ through the receiver-to-microphone air path.

Line Equalisation

This is an amplitude compensation, not a frequency compensation, function, and must be considered separately in the cases of both transmission and reception.

Transmission Loss Compensation

The alternating voltage input to transistor TR1 is taken across the variable resistance represented by diodes D1 and D2 in series. This resistance — say $r_d$ — forms part of a voltage divider, of which the fixed resistor R7 forms the other part. The variable resistance $r_d$ increases, hence varying the alternating voltage input to TR1, as the cable or line resistance increases; and conversely, the resistance $r_d$ decreases as the cable or line resistance decreases, because the direct current through D1 and D2, derived from the line, decreases or increases accordingly. These changes in line current affect the node potential at the junction A in FIG. 1. The collector bias voltage of TR2 at B is constant regardless of line resistance, and hence, the direct current flowing through D1 and D2 is controlled by the unidirectional potential drop between A and B, less the diode d-c voltage drops. Finally, the alternating voltage at B is constant regardless of the value of $r_d$. The voltage gain from the microphone to B is defined by the ratio of the resistance R8 to the impedance of the microphone.

Receive Loss Compensation

The variable resistance $r_d$ is used here to represent, or correspond to, the change in direct current through D3 and D4 in series in the receive path. In this case, $r_d$ is the collector load of transistor TR6 and also forms part of an alternating current feedback through R12. Thus, the alternating voltage input to transistor TR5 at point C is reduced when the line resistance is low, and increases with increase of line resistance, thus maintaining substantially uniform input signal level to TR5 and to the receiver proper (R) in spite of variations of subscriber line resistance.

The subset circuit herein described deals only with the electrical transmission aspects, without regard to the ringing and signalling aspects, assumed to be standard.

It is to be understood that the foregoing description of a specific example of this invention is made by way of example only and is not to be considered as a limitation on its scope.

What is claimed is:

1. An electronic telephone transmission circuit (subset) which comprises an electrodynamic microphone and a telephone receiver, a first transistor amplifier for the said microphone having both d.c. and a.c. feedback stabilization, a second transistor amplifier having a.c. feedback stabilization for the said receiver, first variable impedance means responsive to direct flowing into said subset from an external source via a line to which said subset is connected when in use and including a transistor for controlling the amplitude of signal from said microphone amplifier which is fed to such a line, second variable impedance means responsive in like manner to said first variable impedance means for controlling the amplitude of signal, received over such a line and passed to said receiver amplifier, to a substantially constant value regardless of line resistances for said amplifier, and a resistance-capacitance network connected across the line terminals of the subset and adapted to form, together with said transistor and such a line as aforesaid, an arrangement whereby the two directions of transmission within said subset, namely, that due to said microphone and that due to said receiver, are effectively separated.

2. The invention as claimed in claim 2 in which said first variable impedance means includes diodes providing a variation in impedance value in response to changes in direct current bias associated with different subscriber line lengths, whereby alternating voltage appearing across said diodes will be greater for a long subscriber line than for a short subscriber line.

* * * * *

UNITED STATES PATENT OFFICE

CERTIFICATE OF CORRECTION

Patent No. 3,823,272 Dated July 9, 1974

Inventor(s) Camilo Manansala Tabalba

It is certified that error appears in the above-identified patent and that said Letters Patent are hereby corrected as shown below:

Claim 1, line 41, after "direct" insert -- current --.

Claim 2, line 1, "Claim 2" should read -- Claim 1 --.

Signed and sealed this 5th day of November 1974.

(SEAL)
Attest:

McCOY M. GIBSON JR.
Attesting Officer

C. MARSHALL DANN
Commissioner of Patents

ORM PO-1050 (10-69)

USCOMM-DC 60376-P69
U.S. GOVERNMENT PRINTING OFFICE 869-930